United States Patent
Sathe et al.

[11] Patent Number: 6,089,099
[45] Date of Patent: Jul. 18, 2000

[54] METHOD FOR FORMING A BONDED SILICON-GLASS PRESSURE SENSOR WITH STRENGTHENED CORNERS

[75] Inventors: Abhijeet Sathe; Henry V. Allen, both of Fremont, Calif.

[73] Assignee: SMI Corporation, Fremont, Calif.

[21] Appl. No.: 09/150,198

[22] Filed: Sep. 8, 1998

[51] Int. Cl.[7] .................................. G01L 9/00; G01L 9/16
[52] U.S. Cl. ......................................................... 73/754
[58] Field of Search ............................... 29/25.01, 25.02, 29/25.03; 438/53; 338/4; 73/715, 716, 717, 723, 754; 257/414, 415, 419, 420

[56] References Cited

U.S. PATENT DOCUMENTS 4,314,225  2/1982  Tominaga et al. ........................... 338/4
5,444,286  8/1995  Ichihashi ................................. 257/420

Primary Examiner—William Oen
Attorney, Agent, or Firm—Townsend and Townsend and Crew LLP

[57] ABSTRACT

A unique backside mask for the backside of a silicon wafer which is to be diced in a rectangular shape to form a silicon pressure sensor. The backside mask is shaped to extend farther towards the center from portions adjacent to corners of the rectangular shape. In one embodiment, the mask has a cross-shape. The silicon is etched to form a diaphragm, with the corners etching more due to the silicon crystalline structure. This leaves corner regions which are less sloped compared to the sides of the cavity, being substantially vertical or even recessed. A glass substrate with a hole in it is then bonded to the backside to form the sensor.

6 Claims, 2 Drawing Sheets

METHOD FOR FORMING A BONDED SILICON-GLASS PRESSURE SENSOR WITH STRENGTHENED CORNERS

BACKGROUND OF THE INVENTION

The present invention relates to silicon pressure sensors, and in particular to sensors formed with silicon bonded to glass.

For precision applications, pressure sensors fabricated using silicon micromachining are normally anodically bonded to a glass substrate. This substrate provides stress isolation between the silicon sensing element and the housing when the wafer is diced up into individual sensing elements.

Silicon pressure sensors are known to be more sensitive to backside loading of pressure than top-side loading. In part this is due to the effects of the sidewalls acting as additional surfaces to exert pressure against. Topside loading tends to compress these surfaces while backside loading tends to stretch these surfaces, making it easier for the part to blow out.

Analysis has traditionally shown that by rounding the interface between the diaphragm area and the sidewalls, a good portion of the problems of backside loading can be addressed. Recently, however, as die size has shrunk, a secondary failure has been observed in a number of devices. This failure is that, when the part which is anodically bonded to the glass is overstressed with pressure from the backside, the entire edge of the die blows out This fractures the glass and takes out the entire edge of the die from one edge of the cavity to the other edge of the cavity (see FIG. 2B).

The objective of this invention is to substantially reduce the chance of a blow-out in the corner of the cavity in this anodically bonded structure.

SUMMARY OF THE INVENTION

The present invention provides a unique backside mask for the backside of a silicon wafer which is to be diced in a rectangular shape to form a silicon pressure sensor. The backside mask is shaped to extend farther towards the center from portions adjacent to corners of the rectangular shape. In one embodiment, the mask has a cross-shape. The silicon is etched to form a diaphragm, with the corners etching more due to the silicon crystalline structure. This leaves corner regions which are less sloped compared to the sides of the cavity, being substantially vertical or even recessed. A glass substrate with a hole in it is then bonded to the backside to form the sensor.

In one embodiment, where a cross-shaped mask is used, the backside opening ends up having the shape of an octagon. The effect of the structure is to provide that stress risers that propagate to the corners of the die are directed down to the stiffening structure, and the magnitude of the stress risers are then divided in half and spread out from the corner. In addition, the anodic bond area is increased, reducing the chance of a blow-out. Thus, the likelihood of a blow-out at the corner is reduced by distributing the stress and increasing the bondable area.

For further understanding of the nature and the advantages of the invention, reference should be made to the following description taken in conjunction with the accompanying drawings.

DESCRIPTION OF THE PREFERRED EMBODIMENT

Figure 1:
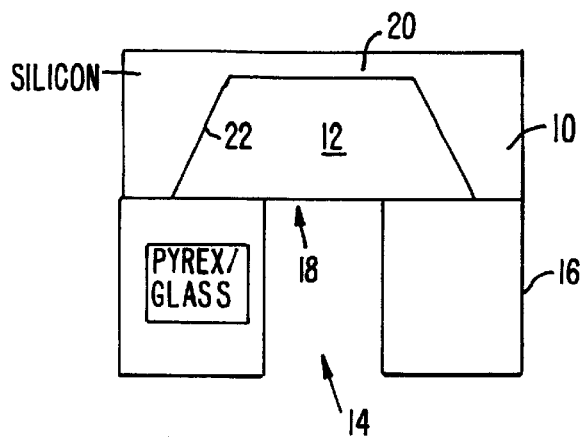
FIG. 1 is a cross-sectional view of a prior art pressure sensor.

FIG. 1 is a cross-sectional view of a prior art pressure sensor showing a silicon block 10 having a cavity 12 which opens into a hole 14 in a glass block 16. The glass block is bonded to backside 18 of silicon block 10. Cavity 12 defines a diaphragm 20 which is used to measure the pressure differential between the two sides of the diaphragm. Sidewalls 22 extend from diaphram 20 to the backside opening.

Figures 2A, 2B:
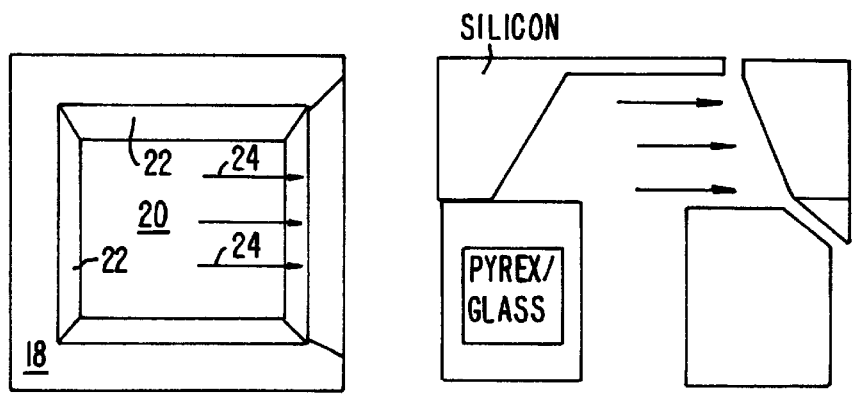
FIGS. 2A and 2B are bottom and cross-sectional views of a prior art sensor illustrating the stresses and blow-out.

FIG. 2A is a backside view of the pressure sensor of FIG. 1 showing the diaphragm 20, the backside 18 and sloping sidewalls 22. Arrows 24 illustrate stresses which may be applied to one side of the sensor. The stress is uniformly applied to all sides; however, the weakest side will tend to break first. The resulting fracture of the sensor is illustrated in FIG. 2B.

Figure 3:
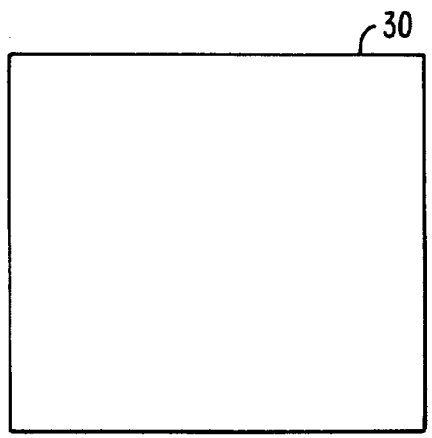
FIG. 3 is a diagram of a prior art backside mask.

FIG. 3 illustrates a mask 30 which is used to create the backside opening of FIG. 1 or 2A. Such a mask will result in sidewalls sloping inward from the backside to the diaphragm as illustrated by sidewalls 22 in FIGS. 1 and 2A.

The basic approach of this invention is to increase the amount of bond surface area in the corners of the cavities. By making a cavity which is etched to look like an octagon at the back of the wafer, yet etching it to look like a square at the diaphragm, one can substantially increase the surface area on the "frame", the area where the glass and silicon will be bonded.

This approach has been used in a number of applications for unconstrained die (die without a glass substrate bonded to the silicon). Examples of this include several medical die and die used for measurement of fuel tank pressure. The main purpose of unconstrained design is two fold. First, it tends to make die-attach easier because then the bond surface looks more like a circle than a square, allowing increased ease in application of silicon RTV die-attach. Second, by adding an area at the corner of the frame, the ability to twist the frame is substantially reduced. This is like a cross-brace in the four corners of a wooden frame to prevent the frame from distorting.

Figure 4A:
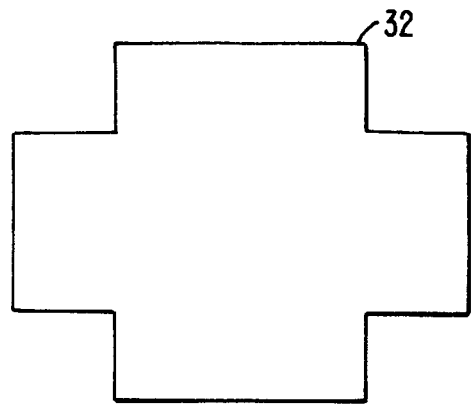
FIGS. 4A and 4B are diagrams of a backside mask according to two embodiments of the present invention.
Figure 4B:
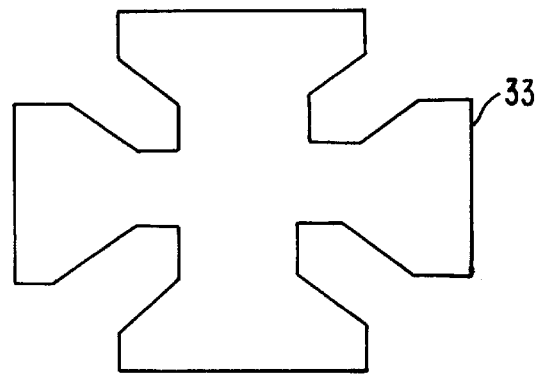
Figure 5:
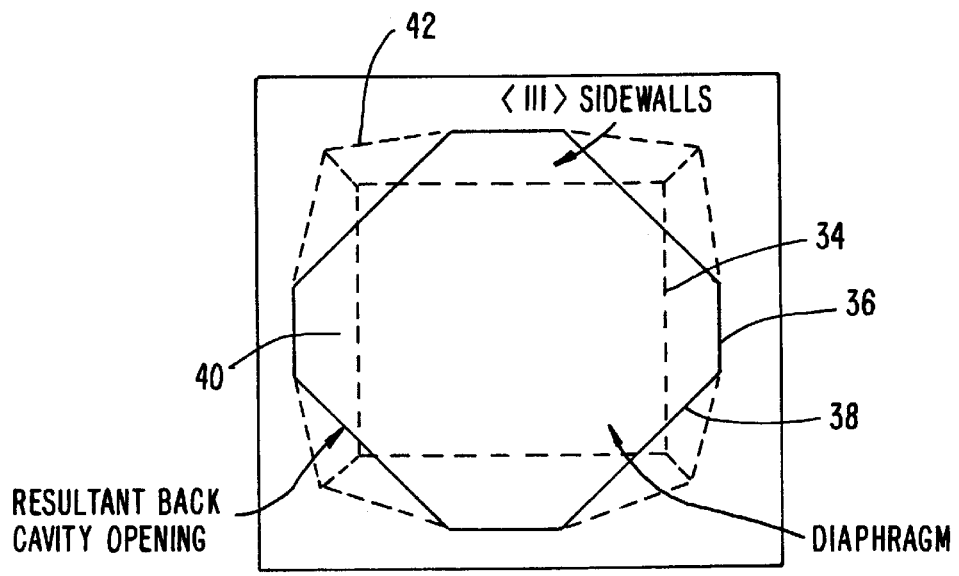
FIG. 5 is a diagram of a cavity resulting from the mask of FIG. 4A.

FIG. 4A shows a cross-shaped mask 32 used in one embodiment of the present invention, to produce a cavity as illustrated in FIG. 5. An alternate cross-shaped mask 33 is illustrated in FIG. 4B. By etching with the mask of FIG. 4A, a rectangular shaped diaphragm 34 results, with a backside opening 36 in the shape of an octagon. By virtue of the way the inside corners at the edges of the cross are attacked, a resulting diagonal wall 38 results at the end of the etch. In between octagon-shaped backside 36 and diaphragm 34, the sidewalls slope inward along the four sides, such as on a sidewall 40. However, near the corners, the sidewalls are recessed as illustrated by dotted lines 42.

The invention addresses a different problem than either of the two issues identified above. By bonding the shaped cavity to glass (see FIG. 5), then stress risers that propagate to the corners of the die are directed down to the stiffening structure and the magnitude of the stress risers are then divided in half and spread out from the corner. Further, the anodic bond area is increased in the process, reducing the chance of a blow-out. The invention's intent is to reduce the likelihood of a blow-out at the corner by distributing the stress and by increasing the bondable area.

The process sequence is identical for the process with and without the backmask/cavity addition. Silicon wafers with <100> crystal orientation are processed to the point of backside cavity formation. A cavity mask that may look line a cross (see FIG. 4) (exact pattern depends on the exact etch solution—KOH, EDP, TMAH, etc.) is patterned on the backside of the silicon and the wafer is etched to the appropriate diaphragm thickness. The cross pattern tends to etch downward along the <111> silicon planes but, at the same time, due to the nature of the etchant and the silicon crystal planes, the interior corners of the silicon tend to be rapidly etched, ultimately leaving only a triangle in each corner of the cavity which has a near vertical side-wall or retrograde sidewalls. Thus, viewing the resultant cavity, one will see the classic <111> walls along the center edges of the cavity but will see a vertical (or inverted) wall in the corners.

The wafer is then cleaned in the normal fashion prior to bond and then bonded to a clean glass wafer with holes drilled into it to allow backside pressure to be applied.

An example of the advantage of this approach is in the EXAR SM5102 product. The normal stepping distance of this device is 2.25 mm. The cavity dimensions, at the back edge of the silicon is approximately 1.55 mm, leaving 0.7 mm total for the bond surface before bond. The nominal saw width is 0.1 mm on each side of the die, further reducing the total bond surface to 0.25 mm on each side of the die. This can be further compromised if the wafer is not perfectly aligned and may reduce the actual bond surface at the corners of the cavity to less than 0.2 mm. Older designs had upwards of 0.425 mm for the total bond surface. With the etch pattern as implemented, the useful bond width at the corners increases by over 0.1 mm, thereby increasing the minimum width by 50%.

Similar advantages can be realized for extreme top-side pressure loading on absolute pressure sensors (no hole in glass, and pressure applied from the top). In this case, increasing the backside bond surface minimizes the change of a weak bond causing a failure such as a slow leak.

As will be understood by those skilled in the art, the present invention may be embodied in other specific forms without departing from the spirit or essential characteristics thereof. Accordingly, the foregoing description is intended to be illustrative, but not limiting, of the scope of the invention which is set forth in the following claims.

What is claimed is:

1. A method for forming a silicon pressure sensor, comprising the steps of:

providing a backside mask for a backside of a silicon wafer to be diced in a rectangular shape, said backside mask having a cross shape such that it extends farther toward the center from sides of said rectangular shape adjacent the corners of said rectangular shape;

etching said silicon to form a diaphram;

forming a plurality of holes in a glass wafer;

bonding said backside of said silicon wafer said glass wafer so that one of said holes is aligned with said diaphram; and dicing said silicon in said rectangular shape.

2. The method of claim 1 wherein said cross-shaped backside mask has wider ends for each side than a portion connecting to a center of said mask.

3. The method of claim 1 wherein said cross-shaped backside mask generates a backside opening opposite said diaphram having the shape of an octagon.

4. The method of claim 1 wherein the walls from said backside to said diaphram adjacent said corners are more recessed than sidewalls between said corners.

5. The method of claim 1 wherein said glass is anodically bonded to said silicon.

6. A method for forming a silicon pressure sensor, comprising the steps of:

providing a backside mask for a backside of a silicon wafer to be diced in a rectangular shape, said backside mask being cross-shaped;

etching said silicon until a backside opening in the shape of an octagon is formed, with sidewalls adjacent corners of said rectangular shape being more recessed than sidewalls between said corners;

stopping said etching upon etching to a substanially rectangular diaphram;

forming a plurality of holes in a glass wafer;

anodically bonding said backside of said silicon wafer said glass wafer so that one of said holes is aligned with said diaphram; and dicing said silicon in said rectangular shape.

* * * * *

UNITED STATES PATENT AND TRADEMARK OFFICE
CERTIFICATE OF CORRECTION

PATENT NO. : 6,089,099
DATED : July 18, 2000
INVENTOR(S) : Sathe et al.

It is certified that error appears in the above-identified patent and that said Letters Patent is hereby corrected as shown below:

<u>Title page,</u>
Item [73], should read as follows:
-- [73] Assignee: Silicon Microstructures, Inc., Fremont, Calif. --.

Signed and Sealed this

Twenty-fifth Day of June, 2002

Attest:

Attesting Officer

JAMES E. ROGAN
Director of the United States Patent and Trademark Office